(12) United States Patent
Ebert (10) Patent No.: US 6,813,554 B1
(45) Date of Patent: Nov. 2, 2004

(54) METHOD AND APPARATUS FOR ADDING COMMERCIAL VALUE TO TRAFFIC CONTROL SYSTEMS

(76) Inventor: Peter Ebert, 2333 Eastridge Ave. #7, Menlo Park, CA (US) 94025

( * ) Notice: Subject to any disclaimer, the term of this patent is extended or adjusted under 35 U.S.C. 154(b) by 15 days.

(21) Appl. No.: 10/077,741

(22) Filed: Feb. 14, 2002

Related U.S. Application Data
(60) Provisional application No. 60/269,209, filed on Feb. 15, 2001.

(51) Int. Cl.[7] ............................................... G06G 7/76
(52) U.S. Cl. ....................................................... 701/117
(58) Field of Search ................................. 701/117, 118, 701/119; 340/921, 927, 928; 705/13

(56) References Cited

U.S. PATENT DOCUMENTS

| | | | |
|---|---|---|---|
| 5,041,828 A | 8/1991 | Loeven | |
| 5,150,116 A * | 9/1992 | West | 340/928 |
| 5,257,194 A | 10/1993 | Sakita | |
| 5,432,547 A | 7/1995 | Toyama | |
| 5,459,665 A | 10/1995 | Hikita et al. | |
| 5,627,549 A * | 5/1997 | Park | 701/300 |
| 5,668,717 A | 9/1997 | Spall | |
| 5,734,337 A | 3/1998 | Kupersmit | |
| 6,317,058 B1 | 11/2001 | Lemelson et al. | |
| 6,384,736 B1 | 5/2002 | Gothard | |
| 6,411,889 B1 * | 6/2002 | Mizunuma et al. | 701/117 |

* cited by examiner

*Primary Examiner*—Yonel Beaulieu
(74) *Attorney, Agent, or Firm*—Duane S. Kobayashi (57) ABSTRACT

An apparatus and methods suited to add commercial value to traffic control systems. A computer device is provided that allows connections with a computer network, external sensors or external devices, and a traffic control system. Combinations of the features of the connected components result in a variety of commercially valuable implementations.

3 Claims, 7 Drawing Sheets

FIG.7

METHOD AND APPARATUS FOR ADDING COMMERCIAL VALUE TO TRAFFIC CONTROL SYSTEMS

This application claims the benefit of Provisional Application No. 60/269,209 entitled "Smartlights concept, system and business method to build revenue generating traffic lights using internet technology", filed Feb. 15, 2001.

FEDERALLY SPONSORED RESEARCH

Not applicable

SEQUENCE LISTING OR PROGRAM

Not applicable

BACKGROUND

1. Field of the Invention

The present invention relates to adding commercial value to traffic control systems, and, in particular, to traffic control systems that incorporate the use of computer technology and computer networks.

2. Background of the Invention

Keeping the ever-increasing traffic flowing is one of the biggest challenges in our modern world—especially in highly populated, urban regions. Stop-and-go traffic significantly increases e.g. air pollution, energy consumption, and is prone to increase the number of accidents.

A common method to solve this problem is to build more and wider streets that can handle more volume. But since land is limited and the number of cars keeps growing, this can only be a temporary solution. In addition, each new street produces new intersections that slow down traffic, which is especially true for medium and smaller streets in city areas. A well-known method to help keeping the traffic flowing in these areas is the synchronization of traffic lights. Decreasing or eliminating the need for stops while traveling on main roads can significantly decrease overall travel times, air pollution, energy consumption, etc. This method is applied and has proven to be effective all over the world—even using the common proprietary technology in relatively small areas.

Prior Art

Several prior art patents address different aspects of optimizing the flow of traffic by applying a variety of methods and various technologies. For example, it is known to make use of fuzzy logic or expert systems to determine the distribution of traffic or danger warning information. See, e.g., U.S. Pat. No. 6,317,058.

It is also known to control traffic and traffic signals via neural networks. See, e.g., U.S. Pat. Nos. 5,459,665; 5,668,717.

It is also known to control traffic and traffic signals on a local level in conjunction with an area-wide traffic control system. See, e.g., U.S. Pat. No. 5,257,194.

It is also known to use cameras to monitor traffic violations and record traffic statistics. See, e.g., U.S. Pat. Nos. 5,432,547; 5,041,828; 5,734,337.

However, even if such technology can successfully be applied, the added technology generally increases the cost of traffic control systems. This poses a challenge to the mostly public owners of traffic control systems that rely on limited budgets and non-profit business models.

None of the prior art inventions address the aspect of adding commercial value to traffic control systems e.g. in order to generate the funds needed to provide and maintain them. In particular, none of the prior art inventions address the aspect of using traffic related data to trigger the display of commercials to motorists.

Objects and Advantages

The present invention introduces technology and methods to allow current and upcoming traffic control systems to generate revenue. Investing this revenue into traffic optimization technologies could help to solve the above-described problems caused by slow traffic. The generated revenue could also be used for further research into traffic optimization technologies and the like that helped to increase the quality of live of virtually all citizens.

SUMMARY

The present invention introduces an apparatus and methods suited to add commercial value to traffic control systems. A computer device is provided that allows connections with a computer network, external sensors or external devices, and a traffic control system. Combinations of the features of the connected components result in a variety of commercially valuable implementations. For example, one embodiment of the present invention is to connect an electronic display to the computer device and display commercials to motorists whereby the traffic control system is used to input traffic status data. Another embodiment is to in addition connect a digital camera to the computer device and run image recognition software on the computer device to distinguish between different types of motorists. This allows performing sophisticated advertisement strategies tailored to specific target groups that further the commercial potential of the described implementations.

DETAILED DESCRIPTION

Preferred Embodiment

The present invention can be applied in a variety of ways to add commercial value to traffic control systems. In this specification, the term traffic control system will be used to refer to systems that control traffic by means of traffic lights, electronic displays, and the like. The term commercial value will be used to refer to tangible and intangible value that is generated as a result of a profit oriented method or application.

Figure 1:
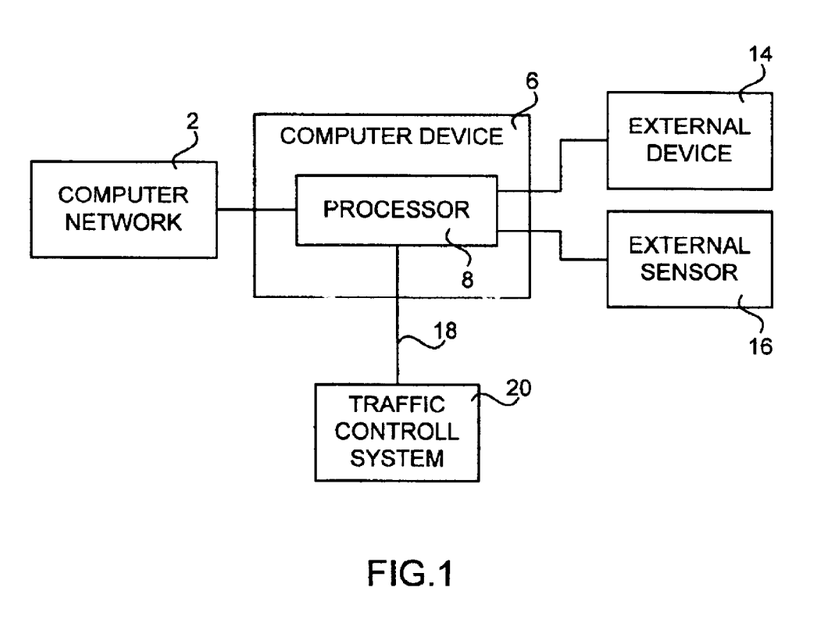
FIG. 1 depicts the invented computer device with a connection to a network, an external sensor, an external device, and a traffic control system.

The following paragraph shall help to build some general understanding of the main vision behind the present invention: particularly in the U.S., commercials provide a significant source of revenue for a multitude of businesses. At the same time, most traffic related assets are owned and maintained by public institutions that rely on limited funds. If these public institutions could leverage the commercial value of their traffic-related assets, it allowed them to invest much more capital into the improvement of traffic-related problems that affect virtually all citizens. At the same time, businesses got access to a huge new electronic commercial media network that would allow a whole new dimension of dynamic, local advertisement opportunities. The present invention provides the following solution to make that vision reality:

A computer device in accordance with the invention can be connected with a traffic control system as shown in FIG. 1: A computer device 6 comprises a central processing unit 8 that is connected with a traffic control system 20, a computer network 2, an external device 14 and an external sensor 16.

There are various ways to deploy the computer device. For example, the computer device can be deployed attached to the traffic control system or to a component thereof. In this case it could use the traffic control system's existing real estate, electrical power infrastructure, or even an existing computer network connection that the traffic control system may feature. In another example, the computer device can also be deployed stand-alone and connected to the traffic control system wired or wirelessly. Yet in another example, the computer device could be integrated into an electronic display mounted in view of motorists traveling along a route controlled by the traffic control system. Further deployment scenarios of the computer device will be obvious to those skilled in the art.

The term connection or electronic connection will be used to refer to any wired or wireless means suited to allow at least one of the following:

a. communication between two electronic devices, networks, or systems;

b. connected electronic devices may also allow being at least partly remote-controlled via the connection;

c. a connection can also be used to merely transfer electricity from one electronic device to another.

The term communication means will be used to refer to any hardware and/or software solution, interface, combination or application that enables the communication between at least two electronic devices.

The term computer network will be used to refer to the Internet, an intranet or any other kind of network that allows the communication between computers.

The term external devices refers e.g. to a. A digital camera, able to capture images, transform these images into a digital data format and provide these data to other devices;

b. An electronic display, suited to display digital content;

c. A wireless voice and data service repeater that, for example, as part of a cellular network;

d. A short-range transmitter or receiver that, for example, allows approaching police or rescue vehicles to send a signal to the short-range receiver to remote-control the status of traffic lights so that the vehicles can move more quickly; or, the vehicles could receive signals from the short range transmitter that contain data suited to calibrate their global positioning system receiver; or, motorists could receive local advertisement information with in-vehicle receivers suited to receive such data;

e. At least a component of an electronic toll collection systems, especially the sensors that allow the unique identification of vehicles;

f. An emergency phone, which can be connected with the computer device to allow e.g. voice-over-IP communication.

The term external sensors refers e.g. to temperature, wind, proximity, and traffic telemetry sensors, that can provide telemetry data to connected devices.

The term sensor device refers to a sensor that features at least a built-in central processor unit.

The connection between the computer device and a traffic control system (see FIG. 1, 18) may be merely an electric connection that e.g. allows the computer device to detect the state ("RED"/"GREEN") of a traffic light connected to the traffic control system. This is certainly true for older traffic systems that do not feature an electronic processor or electronic connections with other devices. For traffic control systems that do feature electronic connections, the computer device could for example use Universal Serial Bus (USB) technology or any other data bus or interface technology, suited to connect to such traffic systems.

The connections between the computer device and external sensors or external devices could for example also use Universal Serial Bus (USB), or any other data bus or interface technology that allows to connect at least one external sensor or external device.

The combination and connection of components shown in FIG. 1 allows a variety of new functions to both the computer device and the traffic control system. For example, the computer device gains access to traffic related data and existing real estate and infrastructure of the traffic control system, whereas the traffic control system e.g. can be remote-controlled and maintained via the connected computer network. Also, the external sensors or external devices connected to the computer device as well as the connected traffic control system can get access to the computer network via the computer device, which would also allow for being at least partly remote-controllable via the computer network.

Operation

Figure 2:
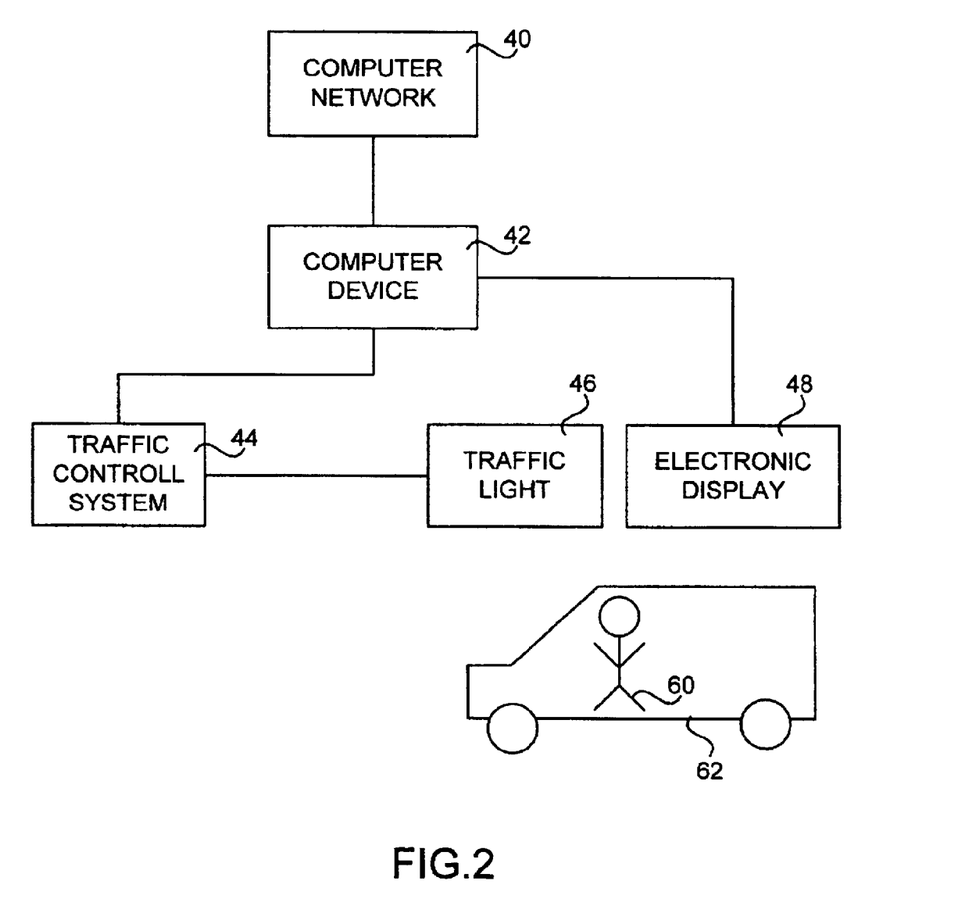
FIG. 2 illustrates one implementation of the invention showing the computer device with connections to a network, an electronic display, and a traffic control system. The traffic control system controls a traffic light. The traffic light and the electronic display are deployed in close proximity so that both are visible to a motorist passing by the traffic light.

FIG. 2 illustrates one implementation leveraging a subset of the above mentioned functions that add commercial value to traffic control system 44: computer device 42 is connected with computer network 40, traffic control system 44, and electronic display 48. Traffic control system 44 controls traffic light 46. Traffic control system 44 continually communicates the status of traffic light 46 to computer device 42. In this example, the communicated status shall be either "RED" or "GREEN".

Figure 3:
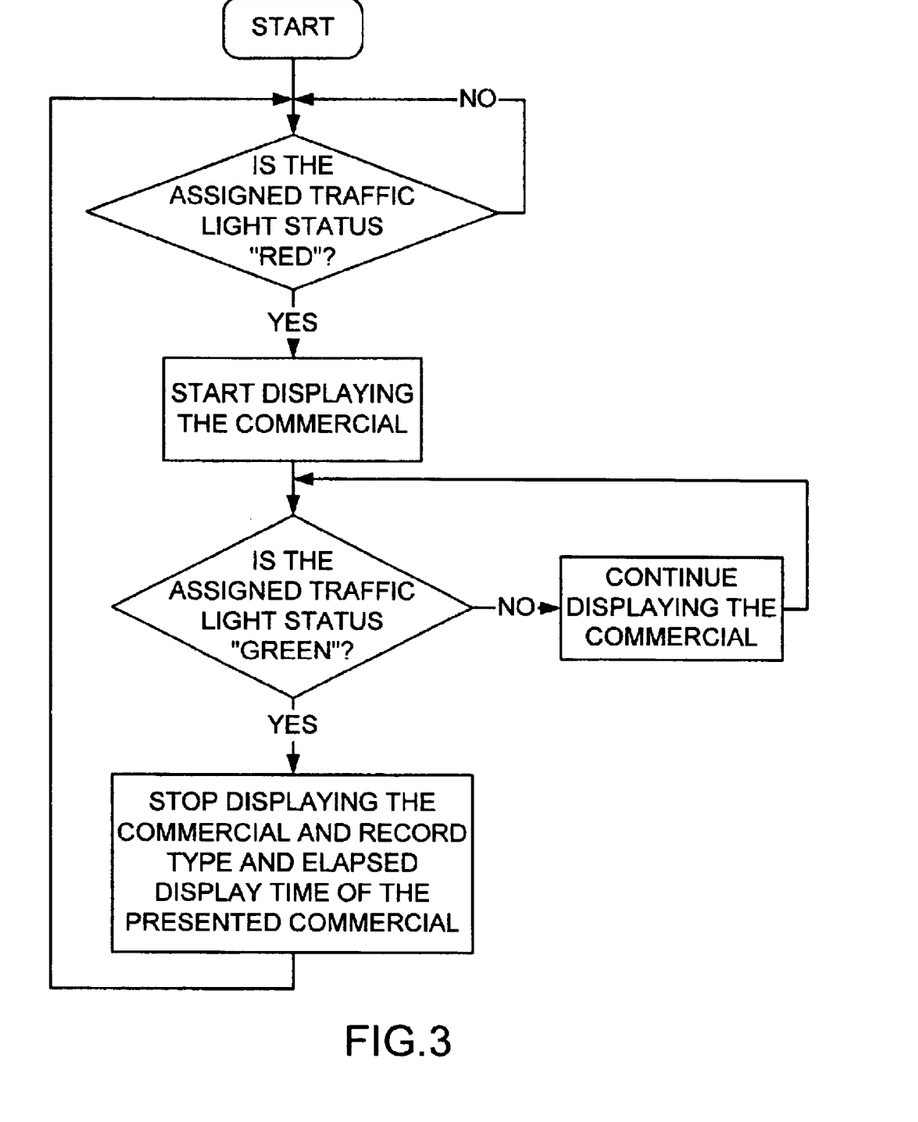
FIG. 3 is a block diagram illustrating the operation of the computer device based on traffic context data as referred to in FIG. 2.

Motorist 60 travels inside of vehicle 62 on the route controlled by traffic light 46. In this implementation, electronic display 48 is mechanically attached to traffic light 46 so that motorist 60 is able to see its content when waiting in front of traffic light 46. FIG. 3 illustrates how computer device 42 uses the communicated status data to only show a commercial on electronic display 48 if the status of traffic light 46 is "RED" and motorist 60 has to wait in front of traffic light 46.

Businesses could e.g. rent display time from the owner of traffic control 44, paying only for display times with audiences based on the data that traffic light 46 recorded.

Since computer device 42 is connected to computer network 40, the commercial can be provided to computer device 42 in a digital format via network 40 comprising e.g. HTML, digital video, a series of digital images, or vector data. This allows for much faster and richer content changes than any poster-based advertisement. In case electronic display 48 uses real estate and existing power infrastructure of traffic control system 44, installation costs can be minimized.

Figure 4:
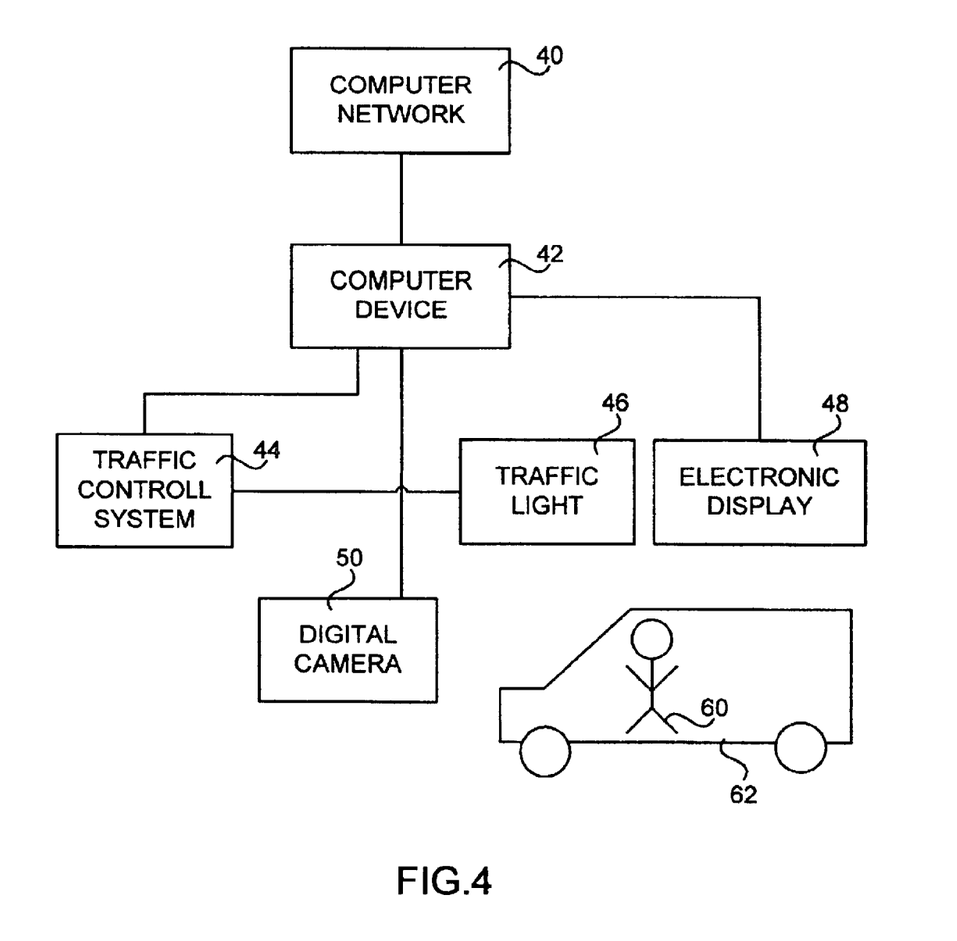
FIG. 4 illustrates another implementation of the invention showing the computer device with a connection to a network, an electronic display, a digital camera, and a traffic control system. The traffic control system controls a traffic light. The traffic light and the electronic display are deployed in close proximity so that both are visible to a motorist passing by the traffic light. The digital camera records and sends digital images of the motorist to the computer device.

FIG. 4 illustrates another implementation leveraging a subset of the above mentioned functions that add commercial value to traffic control system 44: computer device 42 is connected with computer network 40, traffic control system 44, electronic display 48, and digital camera 50. Traffic control system 44 controls traffic light 46. Traffic control system 44 continually communicates the status of traffic light 46 to computer device 42. In this example, the communicated status shall be either "RED" or "GREEN".

Motorist 60 travels inside of vehicle 62 on the route controlled by traffic light 46. In this implementation, electronic display 48 is mechanically attached to traffic light 46 so that motorist 60 is able to see its content when waiting in front of traffic light 46.

Computer device 42 has access to different editions of a commercial, entitled "FORD", "ROLEX", and "STANDARD", each of which shall be shown to a specific type of motorists identified by the type of vehicle that a motorist is traveling in.

Figure 5:
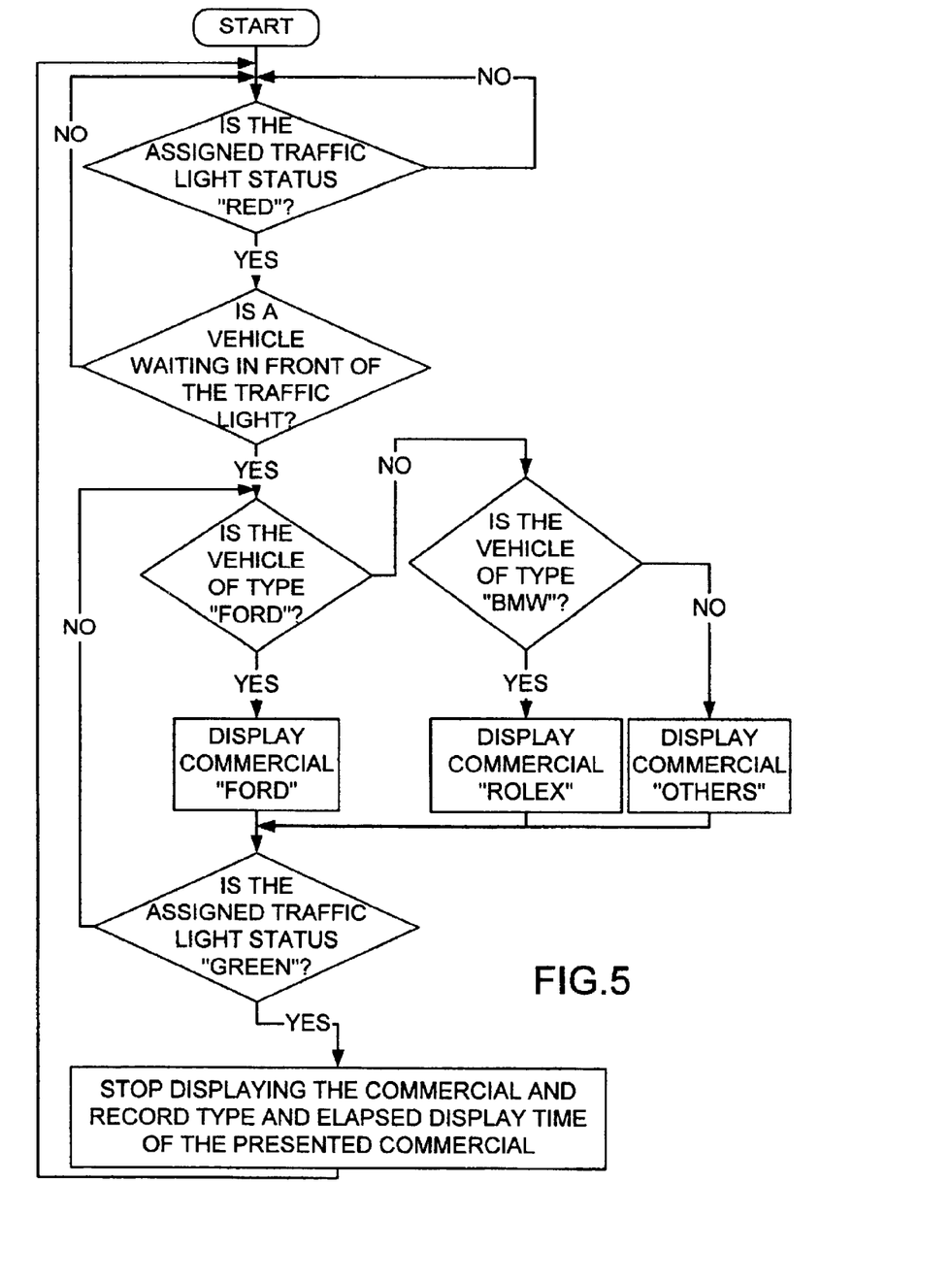
FIG. 5 is a block diagram illustrating the operation of the computer device based on traffic context data as referred to in FIG. 4.

FIG. 5 illustrates how computer device 42 uses the communicated status data of traffic light 46 and the input of digital camera 50 to detect when vehicle 62 is waiting in front of traffic light 46. Digital camera 50 will record and feed digital images of vehicle 62 to computer device 42. Computer device 42 runs an image recognition software application that is able to distinguish between the following types of vehicles: "FORD", "BMW" and "OTHERS", based on the images recorded by digital camera 50.

This could for example be accomplished by comparing a database containing vehicle shape information with the images recorded C) by digital camera 50. In a more sophisticated implementation, the image 4 recognition software application could analyze images of the license plate of vehicle 60 to identify the license plate number of vehicle 60. This data could be used to retrieve the type of a specific car, for example via matching the license plate number with data of a database connected via the computer network, the database holding license plate-vehicle type relations.

Upon recognition of a specific type of vehicle, computer device 42 will display the corresponding commercial. As soon as traffic control system 44 reports a "GREEN" status of traffic light 46, computer device 42 will stop displaying the commercial and record the type and elapsed time of the shown commercial.

Figure 6:
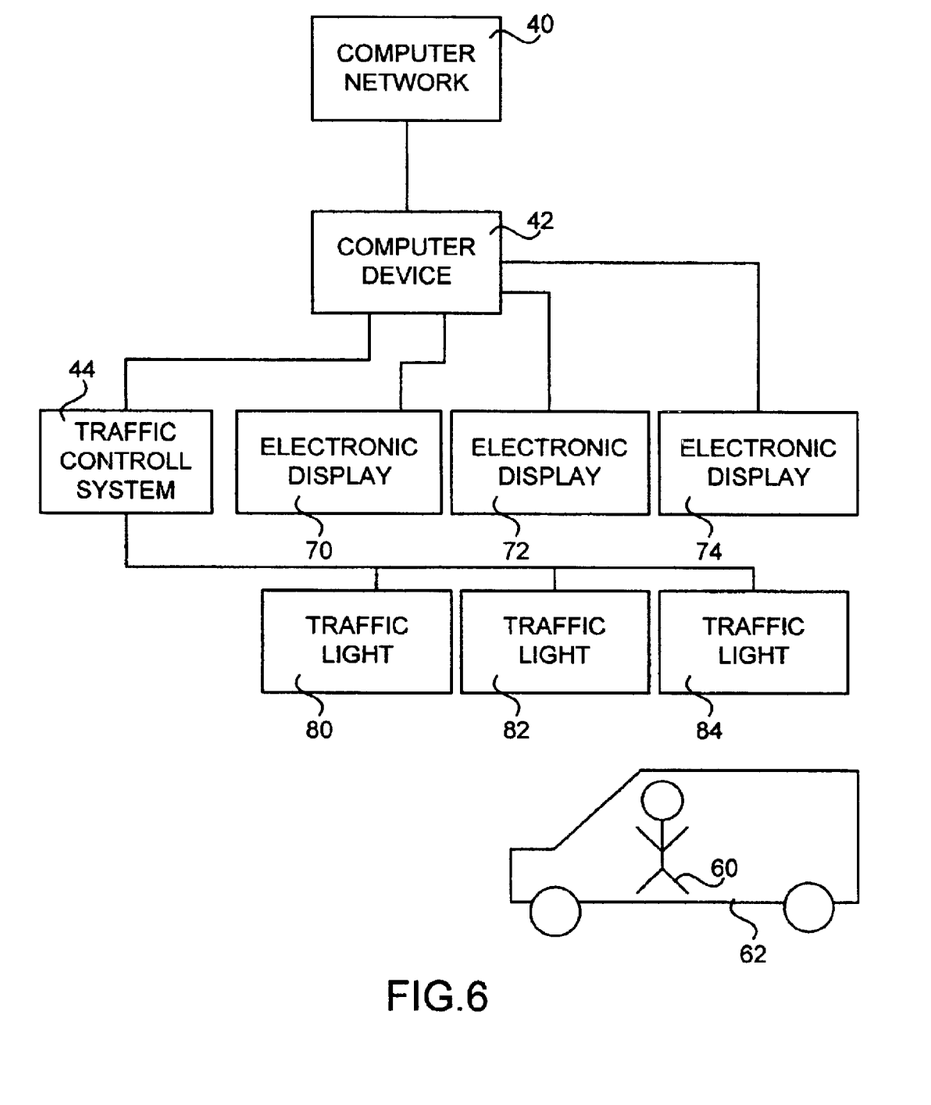
FIG. 6 illustrates yet another implementation of the invention showing the computer device with a connection to a network, three electronic displays, and a traffic control system. The traffic control system controls three traffic lights. Each of the traffic lights is deployed in close proximity to one of the electronic displays so that both are visible to a motorist passing by each of the traffic lights.

FIG. 6 illustrates yet another implementation leveraging a subset of the above mentioned functions that add commercial value to traffic control system 44: computer device 42 is connected with computer network 40, traffic control system 44, and three electronic displays 70, 72, and 74. Traffic control system 44 controls three traffic lights 80, 82, and 84. Traffic control system 44 continually communicates the status of traffic lights 80, 82, and 84 to computer device 42.

In this example, the communicated status shall be either "RED" or "GREEN".

Motorist 60 travels inside of vehicle 62 on the route controlled by traffic lights 80, 82, and 84. In this implementation, electronic displays 70, 72, and 74 are not mechanically attached to traffic light 46. However, motorist 60 is able to see the contents of the electronic devices 70, 72, and 74 when waiting in front of the traffic lights controlled by traffic control system 44.

Computer device 42 has access to different editions of a commercial, entitled "FORD 1", "Ford 2", and "Ford 3", each of which shall be shown to motorists 60 in a sequence when waiting in front of the traffic lights controlled by traffic control system 44.

Figure 7:
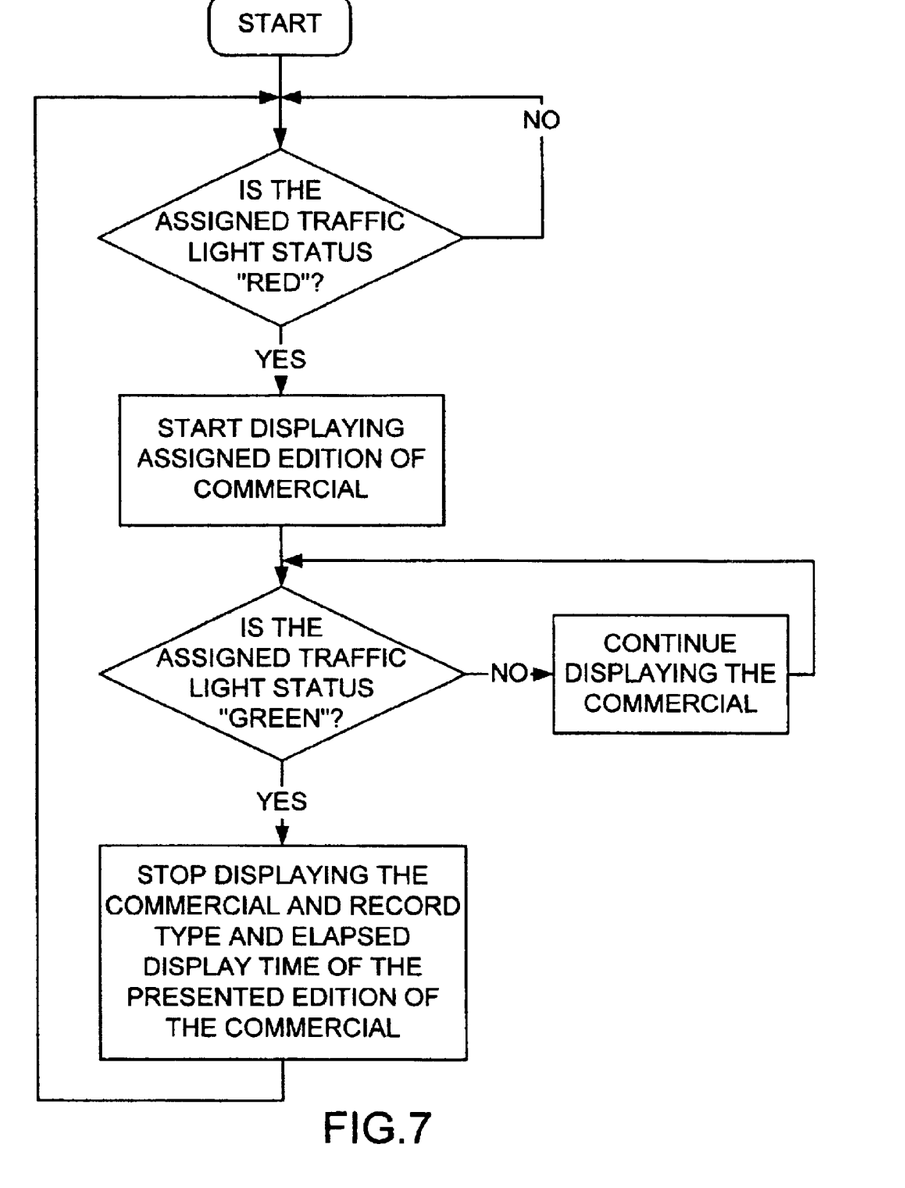
FIG. 7 is a block diagram illustrating the operation of the computer device based on traffic context data.

FIG. 7 illustrates how computer device 42 uses the communicated status data of traffic lights 80, 82, and 84 to detect when vehicle 62 is waiting in front of one of these traffic lights. Computer device 42 will then display the corresponding edition of the commercial so that motorist 60 will see the different editions of the commercial in the defined sequence as he travels along the route controlled by traffic control system 44. Computer device 42 will stop displaying an edition of the commercial and record the type and elapsed time of the shown commercial when the communicated status data of the traffic lights 80, 82, and 84 is "GREEN". This implementation allows displaying sequential editions of commercials that are known to be remembered more than stand-alone commercials.

Description—Additional Embodiment

By connecting wireless voice and data service repeaters as external devices to each of a plurality of computer devices according to FIG. 1 and then using the real estate and electronic infrastructure of the connected traffic control systems to mount the repeaters, the following business benefits can be achieved:

a. provide bandwidth for wireless services like cellular networks in highly populated areas without the need for acquiring real-estate and electric infrastructure, b. use the network access of the computer device for communication between the repeater device and its provider, e.g. for remote-maintenance and diagnosis.

Further implementations and benefits of the invention will be obvious to those skilled in the art.

Conclusions

The inventions set forth above are subject to many modifications and changes without departing from the spirit, scope or essential characteristics thereof. Other embodiments of this invention will be obvious to those skilled in the art in view of the above disclosure. Thus, the embodiments explained above should be considered in all respect as being illustrative rather than restrictive of the scope of the inventions as defined in the appended claims.

What is claimed is:

1. A method of presenting a commercial to motorists, comprising the steps of:

deploying at least one electronic display in view of at least one motorist, each one of said at least one electronic display capable of presenting at least two commercial advertisements;

providing a computer device having access to said at least two commercial advertisements; said computer device controlling the display of said at least two commercial advertisements on said at least one electronic display;

receiving an image of a motor vehicle with the at least one motorist therein;

providing means to interpret the type of motor vehicle based at least in part on said image; and displaying said at least two commercial advertisements based at least in part on the type of motor vehicle; and dividing at least one commercial advertisement of said at least two commercial advertisements into at least two sections, displaying a first section of said at least one commercial advertisement at a first traffic light, displaying a second section of said at least one commercial advertisement at a subsequent traffic light.

2. A method of presenting a commercial to motorists, comprising the acts of:

providing at least one traffic light;

deploying at least one electronic display in view of at least one motorist, each one of said at least one electronic display capable of presenting at least two commercial advertisements;

providing a computer device having access to said at least two commercial advertisements, said computer device controlling the display of said at least two commercial advertisements on said at least one electronic display, said computer device monitoring the status of said at least one traffic light;

receiving an image of a motor vehicle with the at least one motorist therein;

providing means to interpret the type of motor vehicle based at least in part on said image;

selecting one of said at least two commercial advertisements at least based in part on the type of motor vehicle;

displaying said at least two commercial advertisements based at least in part on the status of said at least one traffic light; and dividing at least one commercial advertisement of said at least two commercial advertisements into at least two sections, displaying a first section of said at least one commercial advertisement at a first traffic light, displaying a second section of said at least one commercial advertisement at a subsequent traffic light.

3. A method of presenting a commercial to motorists, comprising the acts of:

providing at least one traffic light;

deploying at least one electronic display in view of at least one motorist, each one of said at least one electronic display capable of presenting at least one commercial advertisement;

providing a computer device having access to said at least one commercial advertisement, said computer device controlling the display of said at least one commercial advertisement on said at least one electronic display, said computer device monitoring the status of said at least one traffic light; and advertisement based at least in part on the status of said at least one traffic light; and dividing at least one commercial advertisement of said at least two commercial advertisements into at least two sections, displaying a first section of said at least one commercial advertisement at a first traffic light, displaying a second section of said at least one commercial advertisement at a subsequent traffic light.

* * * * *